US 8,237,769 B2

(12) United States Patent
Crenshaw et al.

(10) Patent No.: US 8,237,769 B2
(45) Date of Patent: Aug. 7, 2012

(54) SYSTEM AND METHOD OF VIDEOTELEPHONY WITH DETECTION OF A VISUAL TOKEN IN THE VIDEOTELEPHONY IMAGE FOR ELECTRONIC CONTROL OF THE FIELD OF VIEW

(75) Inventors: James Crenshaw, Palatine, IL (US); Bruce Augustine, Lake in the Hills, IL (US); Kevin Jelley, La Grange, IL (US); Zhiyuan Li, Lake Zurich, IL (US); Michael Thiems, Edwardsville, IL (US)

(73) Assignee: Motorola Mobility LLC, Libertyville, IL (US)

( * ) Notice: Subject to any disclaimer, the term of this patent is extended or adjusted under 35 U.S.C. 154(b) by 1355 days.

(21) Appl. No.: 11/859,012

(22) Filed: Sep. 21, 2007

(65) Prior Publication Data
US 2009/0079812 A1 Mar. 26, 2009

(51) Int. Cl.
*H04N 7/14* (2006.01)
(52) U.S. Cl. .................. 348/14.04; 348/14.01
(58) Field of Classification Search .......... 348/14.01, 348/14.02, 14.04, 14.08, 14.09
See application file for complete search history.

(56) References Cited

U.S. PATENT DOCUMENTS

| 5,268,734 | A | 12/1993 | Parker et al. |
| 5,434,617 | A | 7/1995 | Bianchi |
| 5,844,599 | A | 12/1998 | Hildin |
| 6,574,378 | B1 * | 6/2003 | Lim ............................. 382/305 |
| 7,015,953 | B2 | 3/2006 | Parker et al. |
| 7,034,927 | B1 | 4/2006 | Allen et al. |
| 7,586,513 | B2 * | 9/2009 | Muren et al. ............... 348/14.01 |
| 7,675,539 | B2 * | 3/2010 | Matsui ....................... 348/14.08 |
| 2005/0073574 | A1 | 4/2005 | Krisbergh et al. |

FOREIGN PATENT DOCUMENTS
WO WO03030558 4/2003

OTHER PUBLICATIONS

Bennett, Jane: ParkerVision signs deal with NEC America; Journal; Jun. 27, 1997; Jacksonville Business Jouirnal; http://www.bizjournals.com/jacksonville/stories/1997/06/30/newscolumn5.html.
Shared Reality Classroom; http://www.cim.mcgill.ca/sre/projects/furture.html, downloaded from internet Sep. 7, 2007.

* cited by examiner

*Primary Examiner* — Brian Ensey (57) ABSTRACT

A videotelephony system has an electronically controllable camera with a field of view, a visual token disposed within the field of view, and a camera controller. The camera controller is configured to detect the visual token and reconfigure the field of view relative to a detected position of the visual token.

20 Claims, 8 Drawing Sheets

FIG. 12 ically, a videotelephony system includes a video camera and one or more microphones. The camera captures video, which may then be digitized and transmitted along with sound captured by the microphones to a person or group of people elsewhere. Commonly, such systems are configured for two-way communication between multiple parties. Consequently, a typical videotelephony system will include a visual display and speakers to enable the receipt of video and sound from other locations concurrent with the transmission of video and sound from the local system.
SYSTEM AND METHOD OF VIDEOTELEPHONY WITH DETECTION OF A VISUAL TOKEN IN THE VIDEOTELEPHONY IMAGE FOR ELECTRONIC CONTROL OF THE FIELD OF VIEW

BACKGROUND

In videotelephony, images and sound captured at a first location are combined and transmitted electronically to a recipient at a second location. In this way, people at the two different locations can communicate by both visual and audio means as though in the same room. Consequently, videotelephony is also sometimes referred to as telepresence.

Typically, a videotelephony system includes a video camera and one or more microphones. The camera captures video, which may then be digitized and transmitted along with sound captured by the microphones to a person or group of people elsewhere. Commonly, such systems are configured for two-way communication between multiple parties. Consequently, a typical videotelephony system will include a visual display and speakers to enable the receipt of video and sound from other locations concurrent with the transmission of video and sound from the local system.

Videotelephony systems generally transmit and receive video and sound over any of a variety of information networks, such as the Internet, local area networks (LANs), wireless networks, cellular networks, and standard telephone lines. With recent developments in internet and broadband networking, videotelephony technology has become increasingly popular in a variety of diverse applications.

Due to the dynamic nature of multi-user conferencing, the focus and attention of the attendees of any meeting may be periodically shifted from one participant to another as different participants desire to speak and/or display information. This can present specific challenges to a videotelephony system in the context of video conferencing.

For example, in many teleconferences, multiple participants may be present in one conferencing location with a single camera. Thus, the images of the participants that are captured and transmitted by the camera may make it difficult to determine which participant at that location is speaking, displaying information or should otherwise be the focus of attention for the participants at other locations.

In a videotelephony event, as in any meeting, the focus and attention may periodically shift from one participant or group of participants to another participant or group of participants. These shifts in focus and attention may occur when a new person starts speaking or when attention is to be directed to an object, display or other item that is being discussed. Such shifts will likely occur naturally several times throughout the course of a videotelephony meeting.

To follow the dynamics of the event, it may be desirable for a video camera at each of the conferencing locations to effectively capture video from a changing region of interest as the focus and attention of the meeting shifts among the participants or objects at that location. To assist those at other locations to follow the focal point of the discussion, it may be desirable to automatically frame a field of view of the video camera according to the dynamically changing region of interest.

For example, U.S. Pat. No. 5,268,734, entitled "Remote Tracking System for Moving Picture Cameras and Method," describes a system in which a mobile remote unit that may be moved within the videoconference area is sensitive to infrared (IR) signals transmitted by a base or stationary unit. The stationary unit includes an IR transmitter placed behind a rotating lens resulting in an IR signal being "scanned" across the videoconference area. The remote unit detects when the peak strength of the signal occurs and provides this data via a radio frequency (RF) signal back to the base unit. Using this information, the effective angle between the axis of the IR signal and the remote unit is used to create an error signal with which the base unit can position the video camera mounted thereon.

It should be noted, however, that this and similar prior art systems require the use of an entirely separate system, such as the infrared transmitter and an RF receiver for tracking the mobile remote unit to obtain information for positioning the videotelephony camera. This adds further complexity and expense to the videotelephony system.

BRIEF DESCRIPTION OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

The following specification describes systems and methods in which a visual token is used by the participants at a single location of a videotelephony teleconference to indicate where or upon whom the focus of the local system's video camera should be. By moving or selectively activating the token or tokens within the conference location as the attention of the teleconference shifts, those observing from other locations are better able to follow the flow of the presentation because the video camera focuses on the intended person or object of attention just as would an observer do naturally if at that location of the conference. The visual token is detected within the images taken by the primary teleconference video camera. Consequently, an additional or auxiliary system for locating a token within the conference location is unnecessary.

As mentioned above, videotelephony systems may be used to transmit video and sound from one location to another, or among a number of different locations participating in a telepresence or video conference, also referred to herein as a teleconference or videotelephony conference. In many cases, there may be more that one person at each location involved in the teleconference.

To address the issues of automatically redirecting, focusing or framing the video camera's image or field of view, the present specification describes illustrative systems and methods of videotelephony that provide for token-based automatic control of the camera's field of view. In the illustrative systems and methods, a field of view for a videotelephony camera may be reconfigured relative to the detected position of a visual token imaged by the videotelephony camera.

As used in the present specification and in the appended claims, the term "token" refers to any electronically detectable item that can be located by the videotelephony system within the field of view of the camera such that the camera can be redirected or refocused to direct attention to the area or person associated with the token. The term "visual token" refers to an object, color, shape, pattern, or combination thereof that may be identified electronically in an image or series of images provided by a camera.

As used in the present specification and in the appended claims, the term "activate," when used in reference to a visual token, denotes the act of making a visual token detectable or more detectable to a camera. Likewise, the term "deactivate," denotes the act of making a visual token undetectable or less detectable to a video camera.

As used in the present specification and in the appended claims, the term "electronically controllable" refers to the field of view of a camera and can mean that the camera is physically moved or reoriented to change and control the field of view or, alternatively, the image from the camera is digitally cropped or otherwise electronically processed to electronically control the field of view.

As used in the present specification and in the appended claims, the term "optical energy" refers primarily to light in the visible range of the electromagnetic spectrum, but may include light just outside the visible spectrum, for example, light having a wavelength generally between 10 nanometers and 500 microns. A beam of optical energy may be referred to herein as a "light beam" or "optical beam."

In the following description, for purposes of explanation, numerous specific details are set forth in order to provide a thorough understanding of the present systems and methods. It will be apparent, however, to one skilled in the art that the present systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

The principles disclosed herein will now be discussed with respect to illustrative systems and methods of videotelephony.

Illustrative Systems

Figure 1:
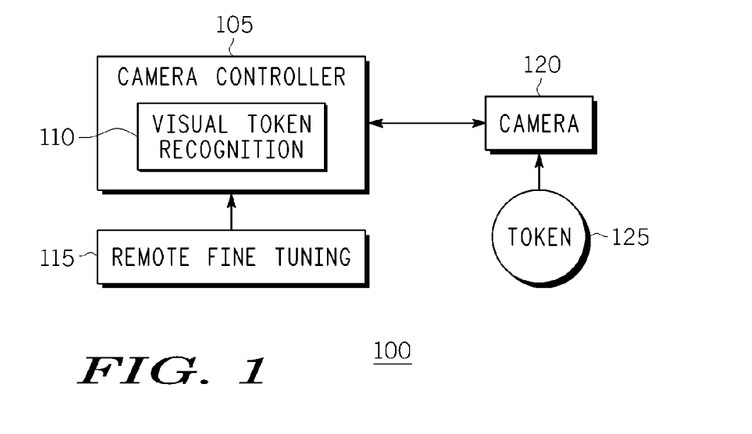
FIG. 1 is a block diagram of an illustrative embodiment of a system of video telephony.

Referring now to FIG. 1, a block diagram of an illustrative videotelephony system (100) is shown. The illustrative system (100) includes an electronically controllable camera (120) that is designed to capture visual images at a particular location of a teleconference. The field of view of the camera (120) may be automatically redirected and refocused to capture images of any of the individual participants in the conference at that location, a group of participants collectively at that location, any objects or displays at that location or any area or aspect of that conference location where the camera (120) is located. The field of view of the camera can be adjusted by, for example, physically reorienting the camera or, alternatively, by using just a selected portion of a wide-angle or panoramic image from the camera.

A camera controller (105) is in communication with the camera (120) such that the camera controller (105) may selectively control the field of view achieved with the camera (120). For example, if the camera (120) is physically reoriented to change the field of view, the controller (105) may adjust pan, zoom, tilt and focus settings of the camera, thereby adjusting a field of view of the camera (120). These settings may be altered, for example, by physically moving the camera (120), camera components or the camera mounting or support structure.

In other embodiments, in which the camera does not physically move but outputs a wide-angle or panoramic image from which a desired field of view can be taken, the controller (105) will digitally select a particular portion of a wide-angle image captured by the camera (120). This selection may be done electronically in software or firmware or any combination thereof without physical movement of the camera (120).

In either case, a selectively activated visual token (125) is disposed within the field of view of the camera (120) such that the visual token (125) is imaged by the camera (120), when activated, and discernible within a video image produced by the camera (120). In some embodiments, the selectively activated visual token (125) may be a pulse of optical energy having a particular color, duration, intensity, modulation pattern, size and/or shape from an optical source. In one example, the visual token (125) may be a pulse of light having a color with a relatively high level of differentiation from surrounding colors, such as a bright green or blue. Specifically, the visual token (125) may be supplied by a light emitting diode that emits light having a particular color. In some embodiments, the light from the visual token may be emitted for a particular duration or in a particular pattern to distinguish the visual token from any other objects in the area that happen to be the same color. In general, the visual token (125) may be a distinctive shape, color, object, pattern, or combination thereof. Anything that can be imaged or detected, generally in the visible spectrum, and then identified and distinguished within the images taken by the principal videotelephony camera can serve as the visual token (125).

The video image may be a digital or analog image, and is transmitted to the camera controller (105). The camera controller (105) includes a visual token recognition module (110) configured to identify the presence of the visual token (125) in the video image produced by the camera (120). Illustrative methods of detecting and distinguishing the visual token with the image from the camera will be discussed in more detail below.

Because the visual token is identified and located within the image produced by the principal videotelephony camera (120), no additional system is required to identify or locate the visual token (125). As described above, in prior videotelephony or video conferencing system, a separate sub-system was needed to detect the location of a remote unit or token within the video conferencing location. When such a separate sub-system is employed, the system may have to register the output of the sub-system with the field of view or output of the videotelephony camera so that the videotelephony camera can be reoriented accordingly. However, in the current illustrative system described by this specification, there is no need to register the location of the visual token identified by some other system with the images taken by the videotelephony camera, because the visual token is detected and identified within the output of the videotelephony camera. Consequently, focusing the camera (120) on a region of interest associated with the visual token can occur more rapidly and accurately.

The visual token recognition module (110) may be implemented in the camera controller (105) using software, firmware, hardware, or any combination thereof. For example, the visual token recognition module (110) may include a piece of electronic hardware configured to receive a digital representation of the video image from the camera (120). The electronic hardware may run software having visual tracking algorithms that cause the electronic hardware to scan the digital representation of the video image for a particular sequence of data, or permutation thereof, that corresponds to the visual token (125). By determining the location of the sequence of data corresponding to the visual token (125) with respect to the rest of the data obtained from the camera (120), the physical location of the visual token (125) within the field of view of the camera (120) may be identified and used to direct the field of view of the camera (120).

Once the relative position of the visual token (125) is discerned with respect to the camera (120), the camera controller (105) is configured to adjust the field of view of the camera (120) relative to the visual token (125). In some embodiments, the camera controller (105) may adjust the field of view of the camera (120) such that the visual token (125) defines the center of the field of view of the camera (120). In other embodiments, the controller (105) may adjust the field of view of the camera (120) such that the visual token (125) defines the bottom of the field of view of the camera (120). This may occur, for example, where a person participating in a video conference has received or activated the visual token on a table in front of the location at the table where that person is seated. The camera (120) will then capture the image of that particular person visible above the token (125). In other examples, the controller (105) may adjust the field of view of the camera (120) such that the visual token (125) defines the top, corner or side of the field of view of the camera (120) as best suits a particular application.

The camera controller (105) may adjust the field of view of the camera (120) in at least two ways: (1) by selectively changing the pan, tilt, zoom, or other settings of the camera (120) or (2) by selectively cropping a wide-angle image from the camera.

In some embodiments, portions of the camera (120) may be mechanically moved by the camera controller (105) to alter pan, tilt and/or zoom settings, and thus adjust the resultant field of view of the camera. Again, this may include redirecting the camera's field of view to a portion of the wide-angle image that is above, below, centered on, at the corner of or otherwise associated with the placement of the visual token.

In other embodiments, the camera (120) has a wide-angle lens, such as a "fish-eye" lens that is configured to capture high-resolution, panoramic images of a room. In such embodiments, as described above, adjusting the field of view of the camera (120) need not necessarily include making mechanical adjustments to the position or orientation of the camera (120). Rather, the field of view of the camera (120) may be adjusted by selecting and transmitting a cropped and/or magnified portion of the entire image captured by the lens of the camera (120). In this case, the wide-angle image is cropped, magnified or otherwise processed to focus attention on a location corresponding to the placement of the visual token (125). As indicated above, this may include changing the field of view to a portion of the wide-angle image that is above, below, centered on, at the corner of or otherwise associated with the placement of the visual token within the wide-angle image.

The visual token (125) may, in some embodiments, be activated for only a short period of time, e.g., just long enough for the visual token recognition module (110) in the camera controller (105) to discern the presence of the visual token (125) in the video image from the camera (120) and adjust the field of view accordingly. The amount of time the token is activated may be used as one factor in distinguishing the token from any other object in the video image output by the camera. For example, if color is used to identify the visual token and some object that happens to be the same color of as the visual token is included in the image, that object will persist in the image over a relatively long period of time. Consequently, that object can be distinguished from a visual token that appears for only a limited period of time upon activation in the images output by the camera.

When adjustments to the field of view of the camera (120) are not required or desired, the visual token (125) may be deactivated. This will conserve a power source within or associated with the visual token (125).

The illustrative system (100) further includes a remote fine tuning controller (115) in communication with the camera controller (105). The remote fine tuning controller (115) may be used to make small or minor adjustments to the field of view of the camera (120) by transmitting instructions indicative of the desired adjustments to the camera controller (105). In some embodiments, a single remote control device may also provide the selectively activated visual token (125) to the camera (120) in addition to serving as the remote fine tuning controller (115).

Figure 2:
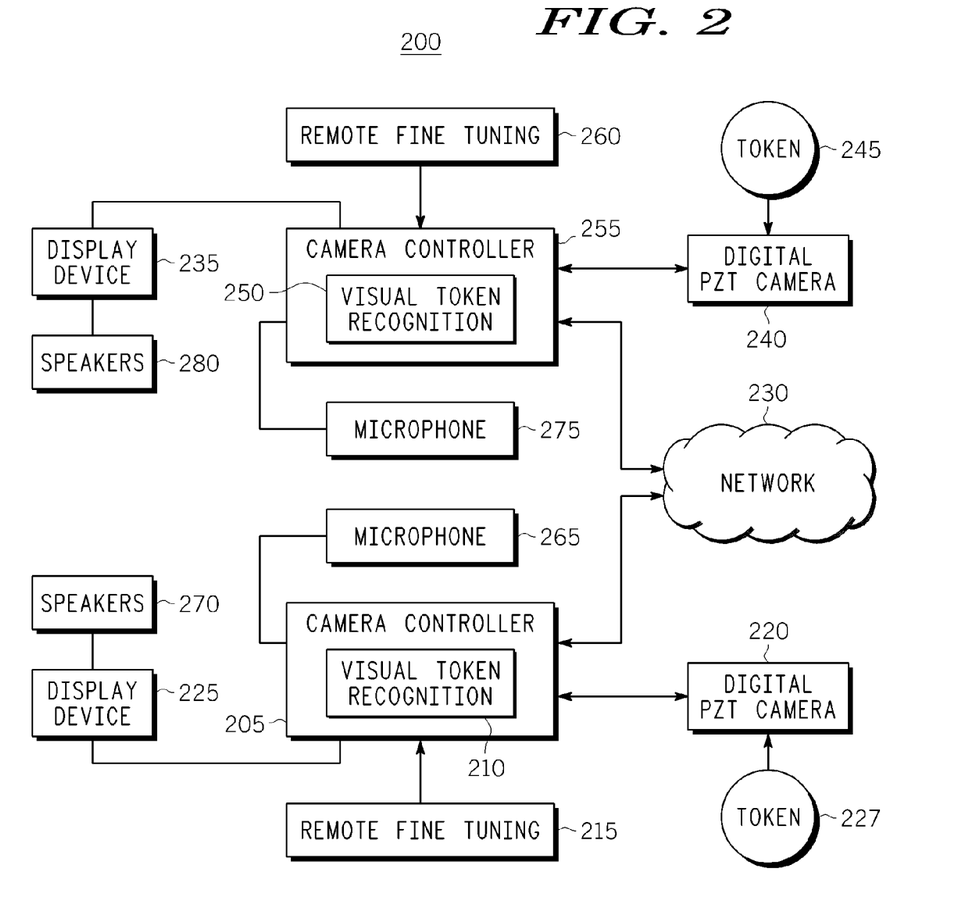
FIG. 2 is a block diagram of an illustrative embodiment of a system of video telephony.

Referring now to FIG. 2, a block diagram of an illustrative two-way videotelephony system (200) is shown. At a first video conference location, the illustrative system (200) includes an electronically controllable camera (220), camera controller (205), display device (225), remote fine tuning controller (215), microphone (265), and speakers (270). Additionally, at a second video conference location, the illustrative system (200) includes an electronically controllable camera (240), camera controller (255), display device (235), remote fine tuning controller (260), microphone (275), and speakers (280). In the illustrated example, at each of the two locations, the camera controller (205, 255) also acts as a central processing unit for the components disposed at that location.

In the illustrated example, each of the cameras (220, 240) is a digital pan, tilt, zoom camera ("PTZ camera") that has a configurable field of view by adjusting pan, tilt, and zoom controls on the cameras (220, 240) or the support system for the cameras (220, 240). In other examples, the cameras could be wide-angle cameras for which the panoramic image can be selectively cropped as explained herein.

Similar to the system (100, FIG. 1) previously described, each of the cameras (220, 240) is configured to detect a corresponding visual token (227, 245, respectively) within its field of view. The camera controllers (205, 255) are in communication with their corresponding cameras (220, 240, respectively), and include visual token recognition modules (210, 250). The operation of the visual token recognition modules (210, 250) will be explained in more detail below. The camera controllers (205, 255) are independently configured to dynamically discern the presence of activated visual tokens (227, 245) in images received from the cameras (220, 240) and adjust the field of view of the corresponding camera (220, 240) accordingly.

Images and sound are transmitted between the two locations by the controllers (205, 255) through a network (230), to which the controllers (205, 255) are connected. The camera (220, 240), microphone (265, 275), display device (225, 235) and speakers (270, 280) at each location are all in communication with and controlled by a respective controller (205, 255). Under this arrangement, images and sound may be captured by a camera (220) and microphone (265) at the first location, transmitted over the network (230) to the second location, and presented to participants at the second location by the display device (235) and speakers (280). Likewise, images and sound may be transmitted from the second location to participants at the first location.

The network (230) may be a computer network, such as the internet, a wide area network (WAN) or a local area network (LAN). In some embodiments, the computer network may be a wireless network, such as a wireless LAN or a cellular network. Accordingly, computers and/or other network devices may be included in the network (230) to facilitate the transmission of data between the first and second location. In other embodiments, the network (230) may be an analog network including transmission lines and amplifiers or repeaters to boost the signals transmitted between the two locations.

Figure 3:
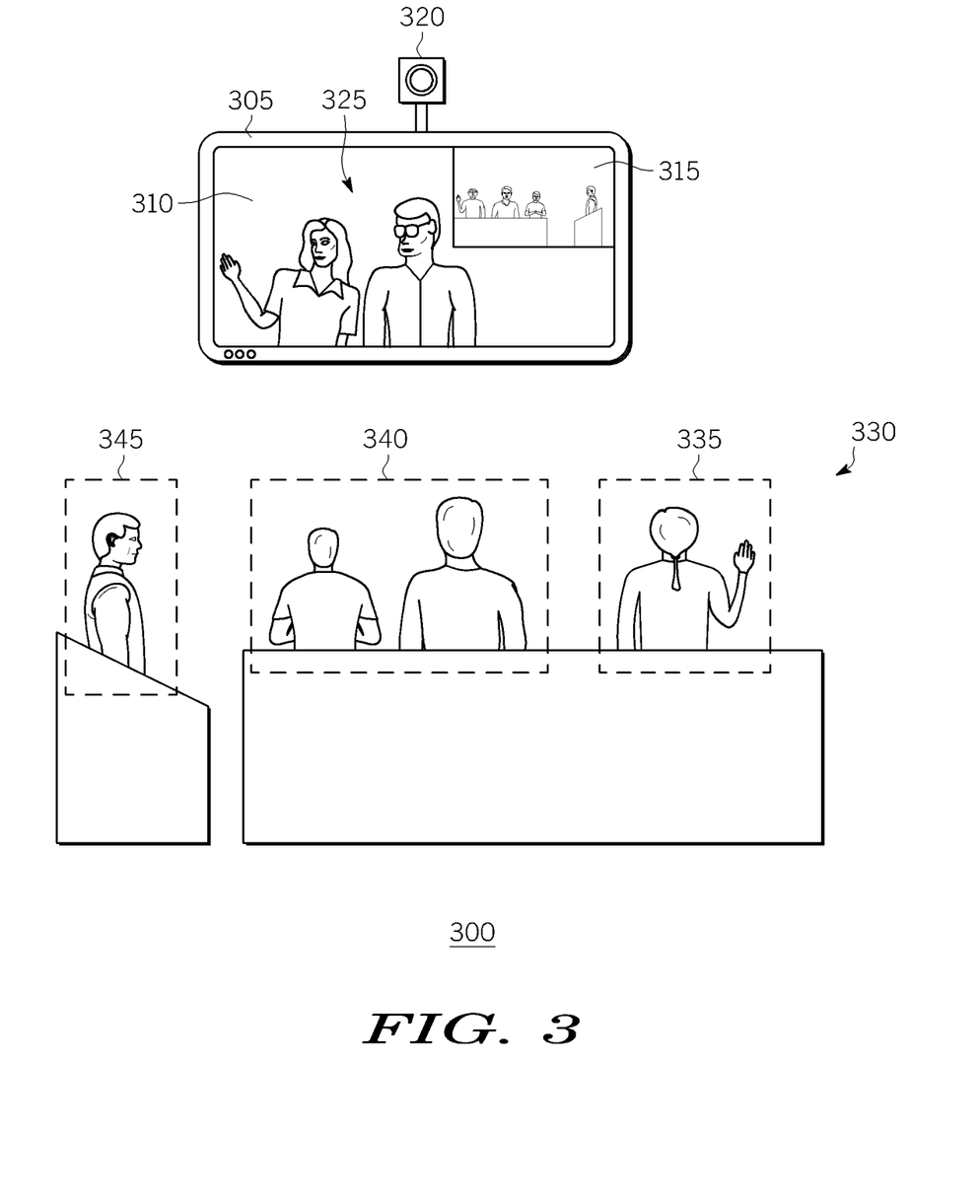
FIG. 3 is a diagram of an illustrative embodiment of a system of video telephony.

Referring now to FIG. 3, portions of an illustrative system (300) of two-way videotelephony are shown. The illustrative system (300) is configured to transfer images and sound from participants (330) in a first location to a second location, while receiving images and sound from participants in the second location. Communication between devices in the two locations is done through a computer network as described herein.

The system (300) includes a large visual display (305) configured to provide an image (325) of participants at the second location on a screen (310). In some embodiments, the visual display (305) is a direct view display, having at least one liquid crystal display (LCD) flat-panel monitor, plasma display, cathode ray tube (CRT) monitor, or the like. In other embodiments, the visual display (305) may be a projection display configured to project the image (325) onto a screen or wall.

An electronically controllable camera (320) is configured to detect an image (315) of the participants (330) at the first location and transmit the image (315) through the network to the participants at the second location. The camera (320) has a field of view that may be controlled and reconfigured by a camera controller (105, FIG. 1). The camera controller has a visual token recognition module (110, FIG. 1). The field of view of the camera (320) may be reconfigured automatically by the camera controller upon detection of an activated visual token within the image (315) captured by the camera. Furthermore, the camera (320) is in communication with the visual display (305), and the image (315) of the participants (330) at the first location may also be displayed on the screen (310) as a "picture in a picture" (PiP).

As is the case with many social gatherings or meetings, the focus or attention of participants may change throughout the course of the event. For example, the focus of an event may be upon a first individual as he or she speaks, and quickly shift to a second individual as the first individual ends speaking and the second individual begins speaking. Accordingly, participants in one location may wish to dynamically view different participants in a second location depending on who is speaking or should otherwise be the focus of attention.

To more fully illustrate the principles described in the present specification, the system (300) is shown with three illustrative regions of interest (335, 340, 345), on which the field of view of the camera (320) may be configured according to the dynamics of the event. Particularly, one illustrative field of interest (335) is shown directed around a participant in the first location desiring to interact with the participants in the second location. Accordingly, the field of view of the camera (320) may be adjusted to focus on or otherwise accommodate the region of interest (335) including the participant that desires to interact specifically with the participants in the second location.

As an example, as shown in FIG. 3, the speaker's region (335) only takes up approximately 25% of the total picture. If the camera does not automatically focus on the speaker's region, most of the image transmitted is unimportant to anyone at the other end attempting to focus their attention on the speaker.

In some embodiments, a plurality of preset regions of interest may be automatically programmed into the system (300) corresponding specifically to seats or other designated portions of that particular conference location where a person or other object of interest is likely to be situated including, for example, a podium, a white or chalk board, a stand, a display device, a table top or the like. The system can then be programmed to adjust the field of view of the camera (320) to that particular preset location whenever the visual token is activated or active within that location. In this way, the system can be programmed to optimally image certain locations or objects within that particular conference location prior to conducting a teleconference.

Upon detection of the visual token, the field of view of the camera (320) may be automatically adjusted to accommodate the preset region of interest deemed most appropriate, according to the physical position of the visual token. In such embodiments, the preset regions of interest may be manually overridden by a user to accommodate a region of interest that is different from the preset regions of interest.

Of course, in other embodiments, the field of view of the camera (320) may be adjusted to accommodate a region of interest without using predetermined settings, for example, by simply detecting the physical position of the visual token and adjusting the settings of the camera (320) such that the visual token occupies a particular position within the field of view of the camera (320) as described above.

Figure 4:
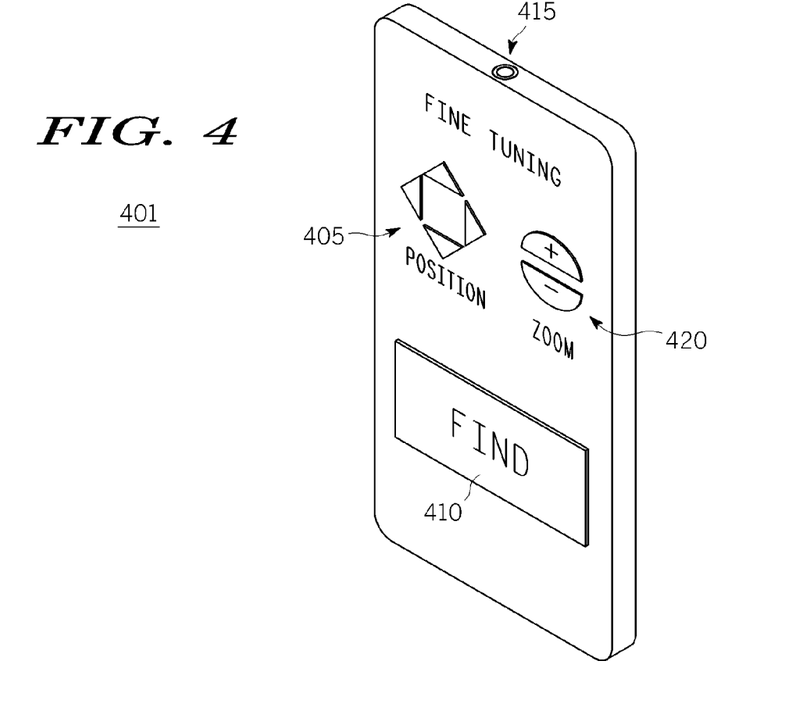
FIG. 4 is a perspective view of an illustrative embodiment of an electronic device in an illustrative system of video telephony.

Referring now to FIG. 4, an illustrative electronic device (401) that may be used in conjunction with the previously described illustrative system (300, FIG. 3) is shown. The illustrative electronic device (401) is in communication with a camera controller (105, FIG. 1) consistent with the principles described in relation to previous embodiments, and serves as a remote fine tuning controller (115, FIG. 1). Furthermore, the illustrative electronic device (401) is configured to activate a visual token (125, FIG. 1) within the field of view of the camera (320, FIG. 3).

In the present example, the selectively activated visual token is a pulse of optical energy from a light emitting diode (415) on the illustrative electronic device (401). When a "FIND" button (410) is depressed on the device (401), the light emitting diode (415) is energized and the visual token is activated. As described herein, the activated token is then detected within the image output by the videotelephony camera and the field of view of the camera is electronically controlled or reconfigured accordingly.

In some situations, the electronic device (401) may be passed to an upcoming speaker before the previous speaker is finished. The new speaker refrains from pressing the FIND button (410) until the previous speaker finishes. The field of view of the videotelephony camera remains focused on the initial speaker, even though that speaker has relinquished the electronic device (410) that serves as the visual token. When the previous speaker finishes, the new speaker then presses the FIND button (410) to reconfigure the field of view of the videotelephony camera to focus on that new speaker who now has the electronic device (410).

In other embodiments, the light emitting diode (415) may be activated periodically to reconfigure the field of view of the videotelephony camera, with or without the existence or use of the "FIND" button. In such embodiments, the electronic device (401) may include an "INHIBIT" button. By way of example, if a current speaker passes the electronic device (401) to a new speaker before finishing, the next speaker can press or hold down the INHIBIT button which prevents the light emitting diode (415) from being activated or otherwise prevents a change to the field of view of the videotelephony camera. When the previous speaker finishes, the next speaker can again press or release the INHIBIT button to reactivate the light emitting diode (415) and appropriately reconfigure the field of view of the videotelephony camera.

The light emitting diode (415) is configured to emit optical energy having particular characteristics that the system will recognize as the visual token. For example, the diode (415) may emit light of a particular wavelength (color) or within a particular range of wavelengths. The diode (415) may also emit optical energy of a particular intensity, duration, on/off pattern, shape or other characteristic that is identified by the system as the visual token. As described above, the camera controller (105, FIG. 1) is configured to discern the presence of the optical energy in an image or images obtained by the camera (320, FIG. 3) and then center or otherwise orient the field of view of the camera (320, FIG. 3) at the detected position of the visual token (120, FIG. 1).

The center of the field of view may then be further adjusted by altering the settings of pan, tilt, zoom, or combinations thereof, in the camera (320, FIG. 3). The illustrative electronic device (401) allows a user to manually adjust pan, tilt, and zoom settings of the camera (320, FIG. 3) with buttons (405, 420). These buttons (405, 420) may be used to fine tune the field of view of the camera (320, FIG. 3) immediately after token-based reconfiguration, or simply to manually control the camera (320, FIG. 3).

Figure 5:
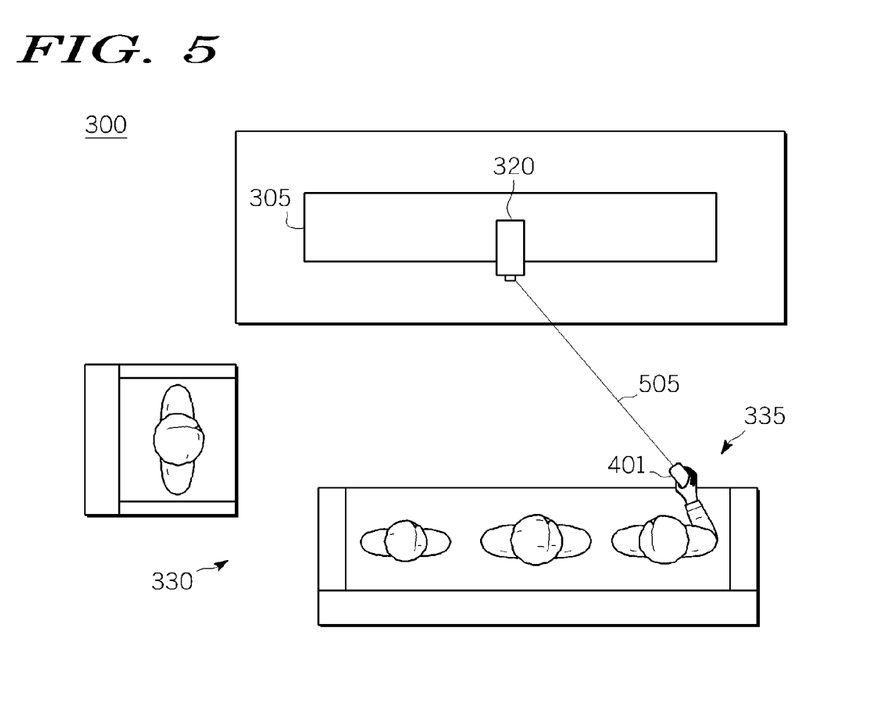
FIG. 5 is a top view diagram of a user providing a visual token in an illustrative embodiment of a system of video telephony.

Referring now to FIG. 5, a top view of the system (300) of FIG. 3 is shown. As shown in FIG. 5, a participant associated with a particular region of interest (335) is using the illustrative electronic device (401) of FIG. 4 to activate a visual token (505) that is visually detected by the camera (320). Accordingly, the field of view of the camera (320) will be automatically restricted to focus on the location (335) in which the visual token (505) is detected. As indicated above, the camera (320) may hone in on the location (335) using preprogrammed parameters associated with that location (335) or may simply control the field of view with respect to the visual token (505).

Figure 6:
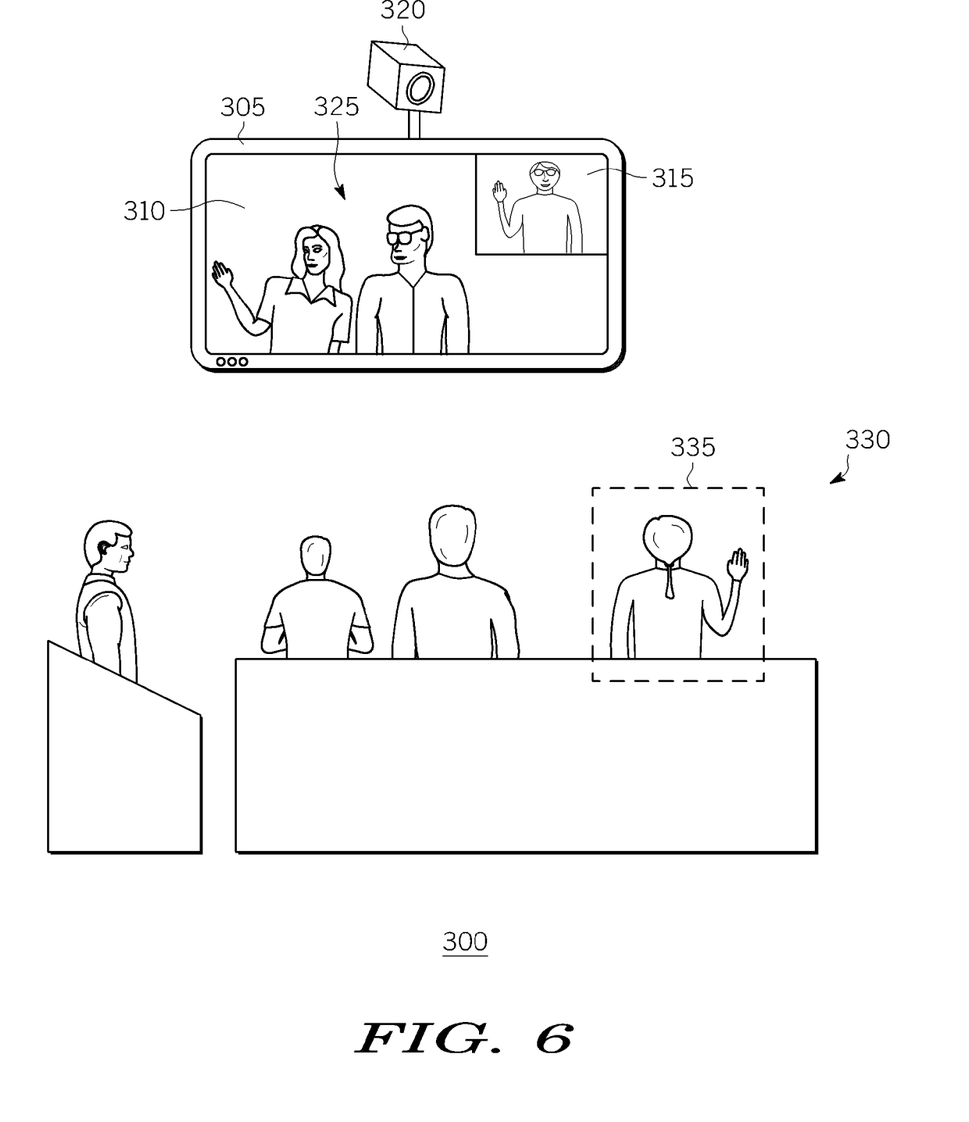
FIG. 6 is a diagram of an illustrative embodiment of a system of video telephony after a field of view has been reconfigured.

Referring now to FIG. 6, the illustrative system (300) is shown immediately after the participant associated with a region of interest (335) has activated the visual token (505, FIG. 5). Upon optical detection of the visual token (505, FIG. 5), a camera controller adjusts the pan, tilt, and zoom settings of the camera (320) such that the region of interest (335) is shown exclusively or as the focus of the image (315) obtained from the camera (320). As mentioned previously, pan, tilt, zoom, and other characteristics of the camera image (315) may be manually adjusted using the electronic device (401).

Alternatively, as mentioned above, the camera (320) may not physically move, but may output a wide-angle image that is appropriately cropped or otherwise processed to focus attention on the location (335) where the visual token has been located. In some examples, the output (315) of this method of configuring the field of view may be indistinguishable from a similar field of view obtained by physically reorienting and adjusting a PZT camera.

In either case, the image (315) obtained from the camera (320) can also be displayed in a portion of the screen (310) at the location where the image (315) is captures. In this way, the image (315) may be used as visual feedback when a user is manually adjusting the image characteristics.

Figure 7:
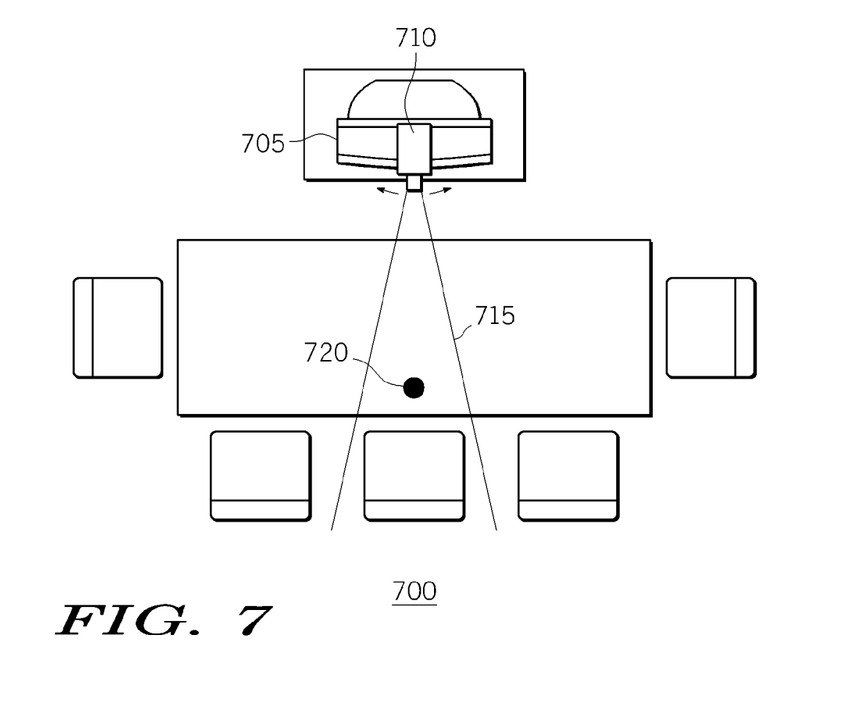
FIG. 7 is a diagram of an illustrative embodiment of a system of video telephony.

Referring now to FIG. 7, a top view of a portion of an illustrative system (700) of two-way video telephony, consistent with principles previously described, is shown in a conference room setting. The system (700) has a visual display (705) and an electronically controllable camera (710), according to principles previously described. An activated visual token (720) is represented as being directly in front of the camera (710). Accordingly, the field of view (715) is centered on the activated visual token (720). In other embodiments, the system may be configured to place the activated visual token (720) in the lower part of the field of view to better capture the image of a person seated at the table on which the token (720) is located.

Figure 8:
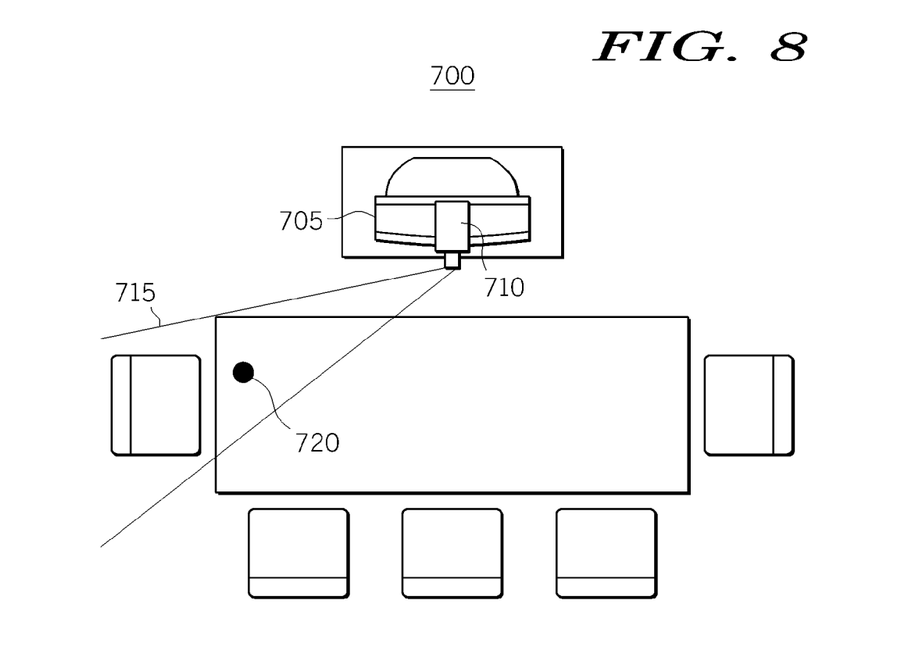
FIG. 8 is a diagram of an illustrative embodiment of a system of video telephony.

Referring now to FIG. 8, the system (700, FIG. 7) of FIG. 7 is shown with the activated visual token (720) at a different position with respect to the camera (710). Accordingly, the field of view (715) of the camera (710) has followed the visual token (720) and is centered approximately on the visual token (720) or just above the token (720).

In the illustrated embodiment, the camera (710) has a "fish-eye" style lens that is capable of detecting images from a very wide-angle field of view without mechanically moving the lens. In this embodiment, the field of view (715) is adjusted and centered approximately at the visual token (720) by digitally selecting a portion of the total image received by the lens of the camera (710) and transmitting only the selected portion to the visual display (705) and any other intended recipient over the network (230, FIG. 2).

In other embodiments, of course, the field of view (715) of the camera (710) may be adjusted and centered approximately at the visual token (720) by mechanically moving the position of the camera (710), which may be accomplished by selectively altering pan and tilt settings, such that the lens of the camera (710) is pointed toward the visual token (720). By then selectively altering a zoom setting of the camera (710), the field of view of the camera (710) may be brought into a state where it substantially captures only a desired region of interest as indicated by the location of the visual token (720).

Figure 9:
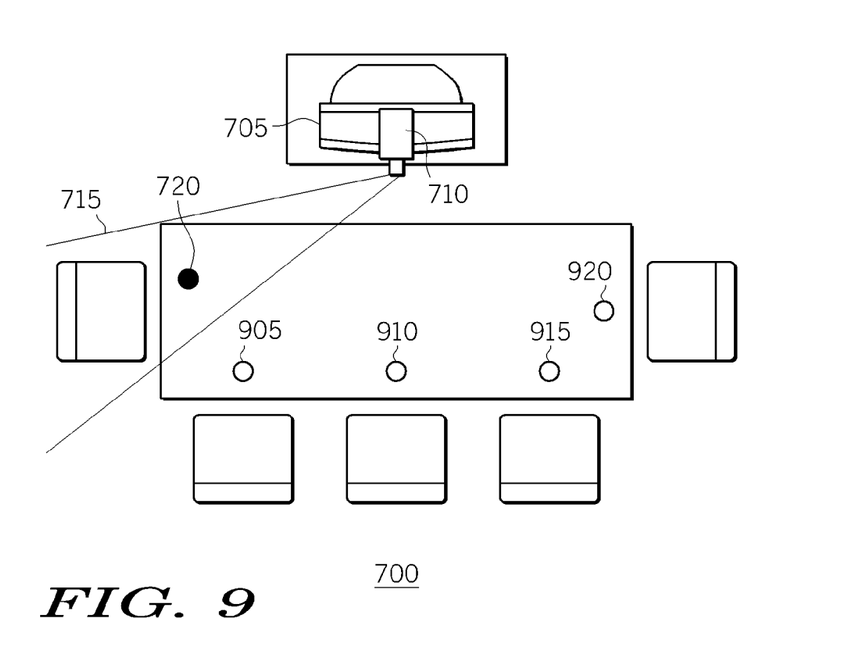
FIG. 9 is a diagram of an illustrative embodiment of a system of video telephony.

Referring now to FIG. 9, the system (700) of videotelephony may include a number of selectively activated visual tokens (720, 905, 910, 915, 920). Each token is available to and represents a different user among those dispersed throughout that particular conference location.

Only one of the tokens (720) is activated, depicted here symbolically by a dark fill color. Accordingly, the field of view of the camera (710) is centered on the activated visual token (720).

In some embodiments, the various visual tokens (720, 905, 910, 915, 920) will be in communication with each other or a central controlling device that will to provide a protocol of activation that ensures that only one of the visual tokens (720, 905, 910, 915, 920) is activated at a time.

For example, each token (720, 905, 910, 915, 920) may wireless communicate its activation state to either a central controlling device or to the electronics of the other various tokens in the vicinity. Consequently, each token, determining the activation status of all the other tokens either directly or through a central controlling device, will not accept a command to activate unless no other token is then indicating that it is already in an activated state.

Alternatively, the camera controller (105, FIG. 1) of the system (700) may determine whether a visual token (720) is active and is being used to direct the field of view of the camera (710). If that is the case, the system (700) may wirelessly transmit a signal to the other tokens (905, 910, 915, 920) that prevents those tokens from being activated or may simply ignore the attempted activation of one of the other tokens (905, 910, 915, 920). When the system (700) is not controlling field of view based on an activated token, the hold signal is discontinued and any of the other tokens (905, 910, 915, 920) may then be activated and the system (700) will respond by redirecting the camera's field of view accordingly.

Under these examples, each participant in the videotelephony system (700) may cause the field of view (715) to be automatically adjusted rapidly by activating a personal visual token (720, 905, 910, 915, 920), thus negating the need to physically move a visual token from one location to another. However, confusion is avoided by preventing, at least in some such examples, more than one token being activated at a time.

In some such examples, it is possible for two people to attempt to activate their respective tokens simultaneously or essentially simultaneously. If this should occur, a conflict management policy will decide which of the two tokens should be activated. For example, a relative priority can be assigned to each of the various tokens. In an instance when an attempt has been made to activate two tokens essentially simultaneously, the token assigned the higher priority will be activated and activation of the token assigned the lower priority will be blocked. The system may be automatically programmed with a time period within which attempts to activate separate tokens are considered simultaneous. This time period may also be set by a user of the system.

Illustrative Method of Visual Token Detection

Figure 10:
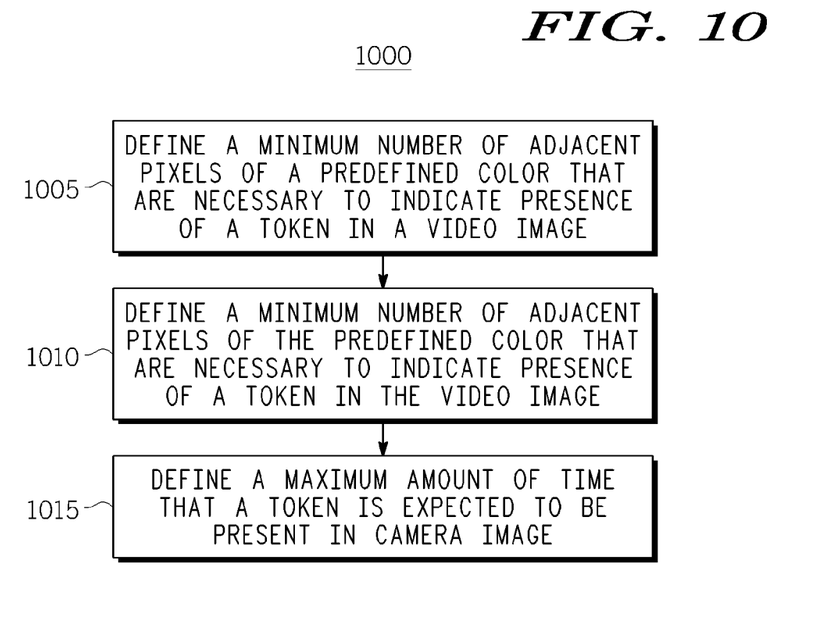
FIG. 10 is a flowchart illustrating an illustrative embodiment of a method of preparing a video telephony system to track a visual token.

FIG. 10 is a flowchart illustrating an illustrative embodiment of a method (1000) of preparing a video telephony system to track a visual token. As will be appreciated by those skilled in the art, the various steps in the illustrated method provide different and independent means for identifying a visual token and distinguishing the visual token from other objects in the video image. Consequently, various steps illustrated in FIG. 10 may be reordered or omitted as will be clear to those skilled in the art as best suits a particular application. Additionally, many other suitable algorithms for detecting a visual token in an image obtained by a video camera will be apprehended by those skilled in the art upon reviewing this specification, the illustrated method (1000) is shown merely as an example of some such techniques that may be employed in some embodiments of the systems disclosed above.

A visual token present in the video image may be represented by a number of adjacent pixels having a particular color representative of the visual token. The visual token may be chosen such that it has a color that is not likely to be found in, and easily distinguished from, other objects or people present within the field of view of the video camera. For example, the visual token may be a spot of bright green light emitted from an LED. Accordingly, the method (1000) includes the step of defining (step 1005) a minimum number of adjacent pixels of a particular color that are considered to indicate the presence of a token in a video image. The designated color may include a range of wavelengths within an acceptable variation from a base wavelength, thus accounting for discrepancies between the actual color of the expected visual token and the perceived color of the visual token in the camera image. Furthermore, the minimum number of adjacent pixels necessary to indicate the presence of the token may vary based on the expected size of the detected visual token in the camera image. The expected size may vary according to different camera settings (e.g. pan, zoom, tilt, and other settings) in addition to variations in the actual physical size of the visual token and its distance from the camera.

A maximum number of adjacent pixels of the predefined color that are considered to indicate the presence of the token in the video image may also be defined (step 1010). By defining a range of minimum and maximum adjacent pixels that indicate the presence of the token, items having a similar color to the visual token, but being significantly larger or smaller than the token, will be prevented from triggering a false token detection.

Similarly, a maximum amount of time that a token is expected to be present in the camera image may be defined (step 1015). In some embodiments, a visual token includes a spot of light from an LED that persists for a specified period of time, and is switched off. Thus, by defining (step 1015) a maximum amount of time that a token is expected to be present in the camera image, static objects or other objects having a similar color and size of the expected token can be prevented from triggering a false token detection.

In some embodiments of the present method (1000), additional threshold, and/or extrema parameters (such as shape, luminance, movement patterns, displacement, etc.) may be defined to assist in the correct identification of a visual token.

Figure 11:
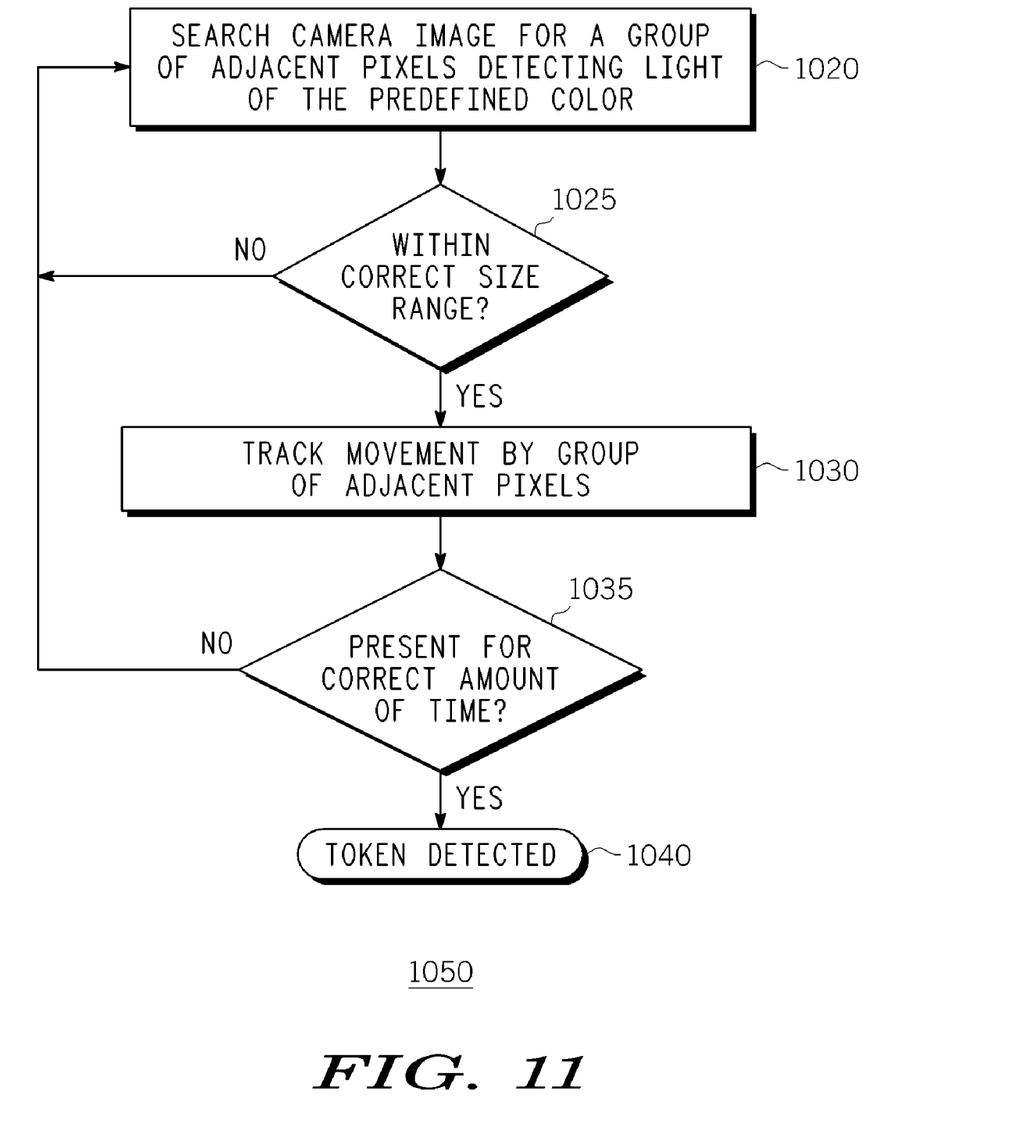
FIG. 11 is a flowchart illustrating an illustrative embodiment of a method of visually tracking a visual token.

FIG. 11 is a flowchart illustrating an illustrative embodiment of a method (1050) of visually tracking a visual token. Given the parameters defined above (steps 1005, 1010, 1015), the camera image is searched (step 1020) for a group of adjacent pixels that detect light of the designated color. Upon detection, it is then determined (decision 1025) whether the group of adjacent pixels is within the correct size range. To be within the correct size range, the group of adjacent pixels must include a number of pixels equal to or exceeding the defined minimum number (step 1005) and equal to or fewer than the defined maximum number (step 1010). In the event that the group of adjacent pixels is not within the correct size range, the search resumes (step 1020) for another group of adjacent pixels producing light of the designated color.

If the group of adjacent pixels is determined (decision 1025) to be within the correct size range, it is next determined whether the group is present for the correct amount of time (decision 1035). As indicated, this will help distinguish between an actual visual token and a persistent element in the video image that is not, but might otherwise be mistaken for, a token. In this context, prior to the pixel grouping in question being considered to be the visual token, relatively minor movement of the group may be tracked (step 1030) in successive images from the videotelephony camera. This movement is distinguished from the movement of a token that triggers reconfiguration of the camera's field of view. Rather, this movement tracking (step 1030) is conducted by comparing successive camera images and is prior to and part of the determination whether the pixel grouping is considered to represent a token. This movement tracking (step 1030) allows a token that is experiencing some slight movement, such as being in the hand of a gesturing speaker, from being ignored by the system simply because there is some displacement of the token between successive camera images.

If the group of pixels in question is in the correct size range and is present for the correct amount of time (decision 1035) accounting for relatively small displacements, the pixel group is determined to be a token (1040). In the event that the group is not present for the correct amount of time in the camera image (decision 1035), the search resumes (step 1020) for another group of adjacent pixels detecting light of the designated color.

In some embodiments, the token may be formed by several LEDs spaced so that an identifiable pattern can be discerned by the camera. In other embodiments, the token could be formed by an illuminant such as an LED placed behind a translucent outline of the logo such that the camera detects a specific and unique form of the token. Still in other embodiments, The LED(s) in the token may blink at regular intervals so that a temporal pattern is also established which can will allow the camera to further discriminate the LED(s) from other items in the image. In still other embodiments, a wireless back-channel (IR or RF) may exist from the camera to the token so that the token's blinking may be synchronized with the camera shutter, thus reducing the total amount of time needed to recognize a token.

Illustrative Method of Videotelephony

Figure 12:
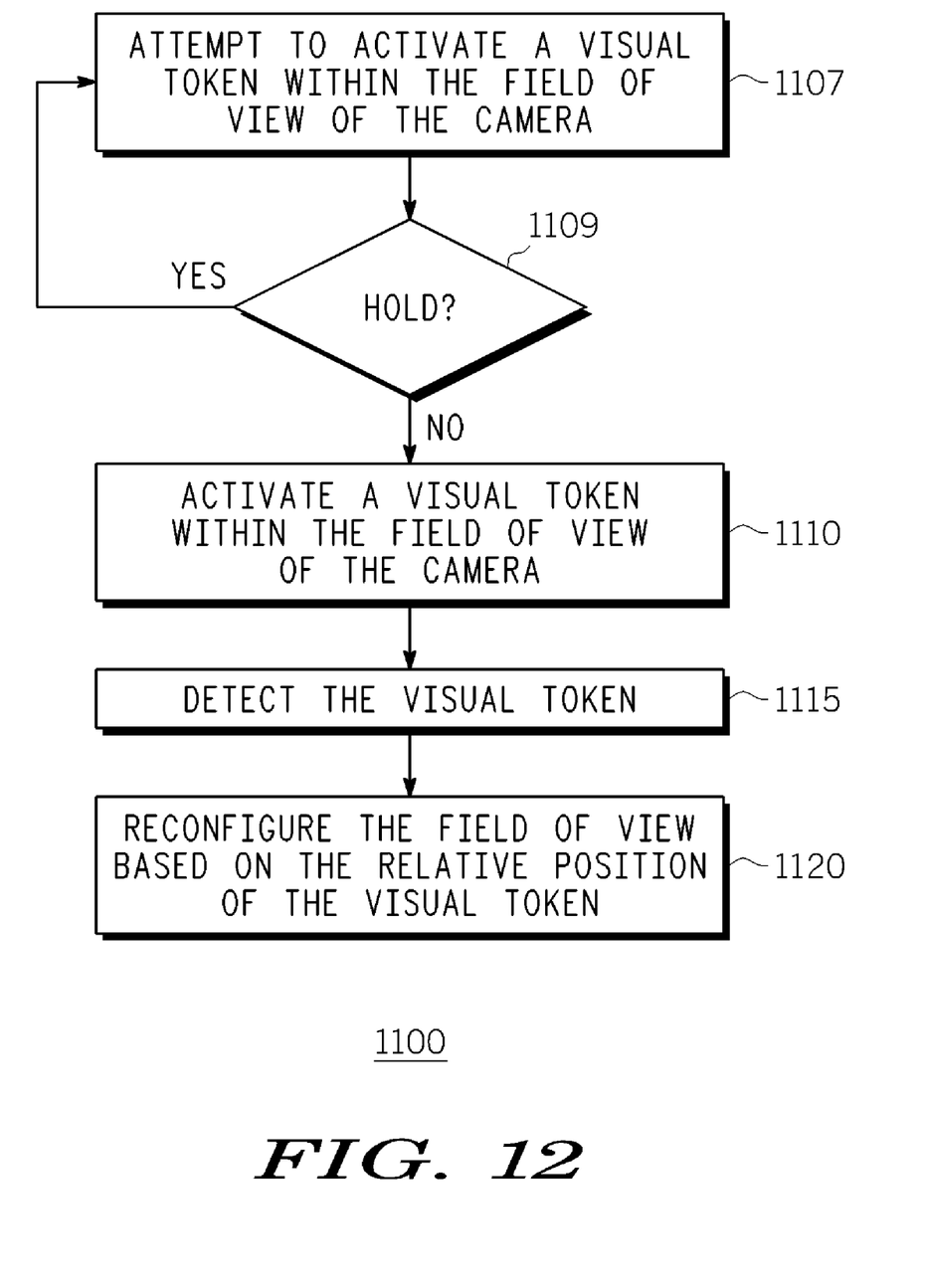
FIG. 12 is a flowchart illustrating an illustrative embodiment of a method of video telephony.

Referring now to FIG. 12, a flowchart illustrating an illustrative method (1100) of videotelephony is shown. The method (1100) is performed using a videotelephony system including a video camera having an electronically controllable field of view.

When a user desires to reconfigure the field of view of the videotelephony system, the user activates a visual token (step 1110). The system then detects the visual token (step 1115) and accordingly reconfigures the field of view of the video camera based on the relative position of the visual token (step 1120). These steps of the method will be described in more detail below.

In embodiments in which multiple video tokens are used, as described above, when a user attempts to activate one of the visual tokens (step 1107), the token or the system supporting the token will determine (determination 1109) if there is a hold on activation of a new token. As explained above, some embodiments may have a system that prevents a second token from being activated when a first token is still being used to control the attention of the system. In embodiments where only a single visual token in use, step 1009 of the illustrated method would be omitted. If no hold is currently effective (determination 1109), the visual token is activated (step 1110) within the field of view of the camera.

As described herein, the visual token may be a pulse of optical energy having a color or wavelength that is easily discernible in an image captured by the camera, for example an infrared or ultraviolet wavelength detectable by the camera. In some embodiments, the visual token is activated (step 1110) by depressing a button or similar indicator on an electronic remote control device.

As noted above, the method further includes detecting (step 1115) the visual token and reconfiguring (step 1120) the field of view of the camera relative to the detected position of the visual token. The visual token may be detected (step 1115) by hardware or software in a camera controller and a relative position of the visual token within the field of view of the camera may be discerned. The step of reconfiguring (step 1120) the field of view relative to the detected position of the visual token may include centering the field of view at the detected position. Additionally, the field of view may be automatically reconfigured by a camera controller that selectively adjusts pan settings, zoom settings, tilt settings, other settings, and/or combinations thereof.

In some embodiments, a system employing the method (1100) may include a number of preset regions of interest, as described above. A default region of interest may be chosen by a user based on preference using a visual token, as mentioned previously.

In such embodiments, upon detection (step 1115) of the visual token, the step of reconfiguring (step 1120) the field of view of the camera may include automatically adjusting the field of view to accommodate the preset region of interest deemed most appropriate, according to the physical position of the visual token. In such embodiments, the preset regions of interest may be manually overridden by a user to accommodate a region of interest that is different from the preset regions of interest.

Of course, in other embodiments, the field of view of the camera may be adjusted to accommodate a region of interest without using predetermined settings, for example, by simply detecting the physical position of the visual token and adjusting the settings of the camera such that the visual token occupies a particular position within the field of view of the camera.

The method (1100) may further include performing additional fine tuning on the field of view after the step of reconfiguring the field of view relative to the detected position of the visual token. This fine tuning may be performed using manual controls on an electronic remote control or other apparatus. In some embodiments, a single electronic remote control device may provide both the selectively activated visual token and the aforementioned fine tuning of the field of view.

The method (1100) may also include transmitting an image from the camera to a remote party over a network. Sound may be transmitted with the image over the network. Additionally, images and/or sound may be received over the network from the remote party.

The methods shown in FIGS. 10-12 may be implemented in a general, multi-purpose or single purpose processor. Such a processor will execute instructions, either at the assembly, compiled or machine-level, to perform that process. Those instructions can be written by one of ordinary skill in the art following the description of FIGS. 10-12 and stored or transmitted on a computer readable medium. The instructions may also be created using source code or any other known computer-aided design tool. A computer readable medium may be any medium capable of carrying those instructions and include a CD-ROM, DVD, magnetic or other optical disc, tape, silicon memory (e.g., removable, non-removable, volatile or non-volatile), packetized or non-packetized wireline or wireless transmission signals.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A videotelephony system, comprising:
   a videotelephony camera having an electronically controllable field of view;
   a visual token disposed within said field of view; and
   a camera controller configured to detect said visual token using an image from said camera and reconfigure said field of view relative to a detected position of said visual token.

2. The videotelephony system of claim 1, wherein said field of view is electronically configured by controlling a pan, tilt, zoom or combination thereof of said camera.

3. The videotelephony system of claim 1, wherein said visual token is selectively activated, said camera controller being configured to detect said visual token upon activation and to reconfigure said field of view relative to a detected position of the activated visual token.

4. The videotelephony system of claim 1, wherein said camera comprises a wide-angle lens.

5. The videotelephony system of claim 4, wherein said field of view is electronically configured by selecting a portion of a larger image from said camera with said wide-angle lens.

6. The videotelephony system of claim 1, wherein said visual token comprises a pulse of optical energy.

7. The videotelephony system of claim 1, further comprising one or more predetermined field of view settings from said camera, wherein said camera is set to a said predetermined field of view setting based on location of said visual token.

8. The videotelephony system of claim 1, further comprising a plurality of visual tokens.

9. The videotelephony system of claim 8, further comprising a system that prevent more than one of said plurality of visual tokens from being activated simultaneously.

10. A videotelephony system, comprising:
 a videotelephony camera having an electronically controllable field of view;
 a remote electronic device configured to selectively provide a visual token within said field of view; and
 a camera controller configured to detect said visual token and reconfigure said field of view of said camera relative to a detected position of said visual token.

11. The videotelephony system of claim 10, wherein said remote electronic device comprises an optical source.

12. The videotelephony system of claim 11, wherein said visual token comprises a pulse of optical energy emitted from said optical source.

13. The videotelephony system of claim 10, wherein said remote electronic device is configured to selectively provide said visual token in response to a particular user action.

14. The videotelephony system of claim 10, wherein said camera comprises a wide-angle lens.

15. The videotelephony system of claim 14, wherein said camera controller is configured to reconfigure said field of view by selecting a portion of a larger image detected by camera with said wide-angle lens and transmitting said portion to an intended recipient device.

16. The videotelephony system of claim 10, wherein said field of view is electronically configured by controlling a pan, tilt, zoom or combination thereof of said camera.

17. The videotelephony system of claim 16, wherein said remote electronic device further comprises fine tuning controls configured to selectively control said pan, tilt or zoom in response to input from a user.

18. A method of videotelephony, said method comprising:
 activating a visual token within a field of view of a camera;
 detecting said visual token using an image output by said camera; and
 reconfiguring said field of view of said camera relative to a detected position of said visual token.

19. The method of claim 18, further comprising using a plurality of visual tokens corresponding to different points of interest within said field of view, said plurality of visual tokens being in communication with a system that prevents more than one of said tokens from being active at any particular time.

20. The method of claim 18, further comprising reconfiguring said filed of view by cropping a wide-angle image output by said camera.

* * * * *